(12) United States Patent
Huang et al.

(10) Patent No.: US 9,866,763 B2
(45) Date of Patent: Jan. 9, 2018

(54) AUTO-IRIS CONTROL METHOD

(71) Applicant: Huawei Technologies Co., Ltd., Shenzhen (CN)

(72) Inventors: Tao Huang, Nanchang (CN); Jianzhang Li, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 111 days.

(21) Appl. No.: 14/974,148

(22) Filed: Dec. 18, 2015

(65) Prior Publication Data

US 2016/0105595 A1 Apr. 14, 2016

Related U.S. Application Data

(63) Continuation of application No. PCT/CN2014/077135, filed on May 9, 2014.

(30) Foreign Application Priority Data

Jun. 19, 2013 (CN) .......................... 2013 1 0244065

(51) Int. Cl.
*H04N 5/238* (2006.01)
*H04N 17/00* (2006.01)
*H04N 5/225* (2006.01)

(52) U.S. Cl.
CPC ........... *H04N 5/238* (2013.01); *H04N 5/2254* (2013.01); *H04N 17/002* (2013.01)

(58) Field of Classification Search
CPC .............................. H04N 5/238; H04N 5/2254
See application file for complete search history.

(56) References Cited

U.S. PATENT DOCUMENTS

2007/0165132 A1  7/2007 Okasaka
2007/0263097 A1  11/2007 Zhao et al.
(Continued)

FOREIGN PATENT DOCUMENTS

CN   101064783 A   10/2007
CN   101232583 A   7/2008
(Continued)

OTHER PUBLICATIONS

Nan, T., et al., "Computer Control Technology," Xi'an University of Electronic Science and Technology Press, Aug. 31, 2009, 6 pages.
(Continued)

*Primary Examiner* — Twyler Haskins
*Assistant Examiner* — Fayez Bhuiyan
(74) *Attorney, Agent, or Firm* — Conley Rose, P.C.

(57) ABSTRACT

An auto-iris control method, including setting a target luminance value of an auto iris; collecting an image at a current moment and calculating a luminance value of the image collected at the current moment; comparing the target luminance value with the luminance value of the image collected at the current moment; comparing an absolute value of the luminance difference at the current moment with a preset luminance difference threshold, determining a status of the auto iris at the current moment, and using a corresponding proportional-integral-derivative (PID) algorithm to calculate a direct current control voltage at the current moment; and adjusting an action of the auto iris according to the calculated direct current control voltage.

10 Claims, 5 Drawing Sheets

(56) References Cited

U.S. PATENT DOCUMENTS

| | | | |
|---|---|---|---|
| 2009/0027572 A1 | 1/2009 | Kido et al. | |
| 2009/0198351 A1* | 8/2009 | Kitagawa | G05B 11/42 700/42 |
| 2011/0194851 A1* | 8/2011 | Hjelmstrom | G03B 7/095 396/242 |

FOREIGN PATENT DOCUMENTS

| | | |
|---|---|---|
| CN | 101827217 A | 9/2010 |
| CN | 102135700 A | 7/2011 |
| CN | 102291539 A | 12/2011 |
| CN | 104243835 A | 12/2014 |
| JP | 20090177455 A | 8/2009 |

OTHER PUBLICATIONS

English Translation of Nan, T., et al., "Computer Control Technology," Xi'an University of Electronic Science and Technology Press, Aug. 31, 2009, 8 pages.

Foreign Communication From a Counterpart Application, Chinese Application No. 201310244065.6, Chinese Office Action dated Jan. 26, 2017, 7 pages.

Partial English Translation and Abstract of Chinese Patent Application No. CN101827217, Mar. 1, 2016, 7 pages.

Partial English Translation and Abstract of Chinese Patent Application No. CN102291539, Mar. 1, 2016, 4 pages.

Partial English Translation and Abstract of Chinese Patent Application No. CN102135700, Dec. 9, 2015, 8 pages.

Foreign Communication From a Counterpart Application, PCT Application No. PCT/CN2014/077135, English Translation of International Search Report dated Aug. 4, 2014, 2 pages.

Foreign Communication From a Counterpart Application, PCT Application No. PCT/CN2014/077135, English Translation of Written Opinion dated Aug. 4, 2014, 6 pages.

Partial English Translation and Abstract of Japanese Patent Application No. JP2009177455, Part 1, Apr. 26, 2016, 19 pages.

Partial English Translation and Abstract of Japanese Patent Application No. JP2009177455, Part 2, Apr. 26, 2016, 4 pages.

Foreign Communication From a Counterpart Application, European Application No. 14813843.1, Extended European Search Report dated Apr. 18, 2016, 7 pages.

Foreign Communication from a Counterpart Application, European Application No. 14813843.1, European Office Action dated Mar. 10, 2017, 4 pages.

* cited by examiner

| $Y_{11}$ | $Y_{12}$ | $Y_{13}$ | | $Y_{1m}$ |
|---|---|---|---|---|
| $Y_{21}$ | $Y_{22}$ | $Y_{23}$ | | $Y_{2m}$ |
| $Y_{31}$ | $Y_{32}$ | $Y_{33}$ | | $Y_{3m}$ |
| | | | | |
| | | | | |
| | | | | |
| $Y_{n1}$ | $Y_{n2}$ | $Y_{n3}$ | | $Y_{nm}$ |

| $Y_{11}$ | $Y_{12}$ | $Y_{13}$ | | | | $Y_{1m}$ |
|---|---|---|---|---|---|---|
| $Y_{21}$ | $Y_{22}$ | $Y_{23}$ | | | | $Y_{2m}$ |
| $Y_{31}$ | $Y_{32}$ | $Y_{33}$ | | | | $Y_{3m}$ |
| | | | $Y_{ac}$ | | $Y_{bd}$ | |
| | | | $Y_{bc}$ | | $Y_{ad}$ | |
| $Y_{n1}$ | $Y_{n2}$ | $Y_{n3}$ | | | | $Y_{nm}$ |

AUTO-IRIS CONTROL METHOD

CROSS-REFERENCE TO RELATED APPLICATIONS

This application is a continuation of International Application No. PCT/CN2014/077135, filed on May 9, 2014, which claims priority to Chinese Patent Application No. 201310244065.6, filed on Jun. 19, 2013, both of which are hereby incorporated by reference in their entireties.

TECHNICAL FIELD

The present disclosure relates to the field of iris control technologies, and in particular, to an auto-iris control method and system.

BACKGROUND

An auto iris of a camera lens is used to control the amount of entered light by adjusting a size of a hole between iris blades in the lens, and therefore it is implemented that a moderately exposed image is obtained in different lighting conditions.

Currently, a relatively commonly used auto-iris control method is mainly a direct current drive method, which controls opening and closing of an auto iris by controlling a size of an output direct current drive voltage. An existing direct current drive method may include presetting an initial drive voltage value, calculating a difference between current luminance and target luminance by collecting luminance/chrominance (Y/C) component data of an image, calculating a required direct current drive voltage according to the luminance difference, and adjusting the opening and closing of the auto iris.

However, disadvantages of an existing auto-iris control method lie in that there are many kinds of auto-iris lenses in the current market, and differences exist in parameters of auto-iris lenses of various models or brands, such as a direct current drive voltage, a damping factor of a coil of an iris, and an inertia coefficient of a blade of an iris. In the method in the prior art, it is difficult to implement automatic calibration of auto-iris lenses of different models or brands, and a person is usually required to participate in calibration of an iris control parameter. As a result, calibration of an auto iris requires relatively long time and relatively large human costs.

In addition, an iris drive control circuit is easily affected by factors such as an ambient temperature, a component characteristic difference, and an iris damping change; as a result, a static shift and dynamic drift occur in a direct current drive voltage of the iris, and then a manually calibrated parameter that is set at the time of delivery from the factory is invalid, thereby decreasing control precision. However, the method in the prior art cannot solve the foregoing problems of the static shift and dynamic drift of the iris drive control circuit.

SUMMARY

The present disclosure provides an auto-iris control method and system, which can implement automatic calibration of an auto-iris lens, thereby reducing time and human costs and solve problems of a static shift and dynamic drift of an iris drive control circuit, thereby improving control precision of an iris.

A first aspect provides an auto-iris control method, where the method includes setting a target luminance value of an auto iris; collecting an image at a current moment, and calculating a luminance value of the image collected at the current moment; comparing the target luminance value with the luminance value of the image collected at the current moment, to obtain a difference between them and use it as a luminance difference at the current moment; comparing an absolute value of the luminance difference at the current moment with a preset luminance difference threshold, determining a status of the auto iris at the current moment, and using a corresponding proportional-integral-derivative (PID) algorithm to calculate a direct current control voltage at the current moment; and adjusting an action of the auto iris according to the calculated direct current control voltage.

In a first possible implementation manner of the first aspect, the calculating a luminance value of the image collected at the current moment includes sampling a luminance value of each pixel in the image collected at the current moment, and using the following formula to calculate an average value of luminance values of all pixels in the image, to obtain the luminance value of the image collected at the current moment:

$$Y_t = \frac{\sum_{i=1}^{n}\sum_{j=1}^{m} Y_{ij}}{n \times m}$$

where Yt is the luminance value of the image collected at the current moment; Yij is the luminance value of each pixel in the image collected at the current moment; m is the number of pixels horizontally included in the image; n is the number of pixels vertically included in the image; and n and m are both natural numbers.

In a second possible implementation manner of the first aspect, the calculating a luminance value of the image collected at the current moment includes sampling a luminance value of each pixel in the image collected at the current moment, selecting a central region of the image, and using the following formula to calculate an average value of luminance values of pixels included in the central region of the image, to obtain the luminance value Yt of the image collected at the current moment:

$$Y_t = \frac{\sum_{i=a}^{b}\sum_{j=c}^{d} Y_{ij}}{(b-a+1)(d-c+1)}$$

where Yt is the luminance value of the image collected at the current moment; Yij is the luminance value of each pixel in the image collected at the current moment; a is a value of a start horizontal coordinate of the central region; b is a value of an end horizontal coordinate of the central region; c is a value of a start vertical coordinate of the central region; d is a value of an end vertical coordinate of the central region; and a, b, c, and d are all natural numbers.

With reference to the first aspect or either one of the possible implementation manners of the first aspect, in a third possible implementation manner of the first aspect, the comparing an absolute value of the luminance difference at the current moment with a preset luminance difference threshold, determining a status of the auto iris at the current moment, and using a corresponding PID algorithm to calculate a direct current control voltage at the current moment includes, if the absolute value of the luminance difference at the current moment is greater than the preset luminance difference threshold, using a positional PID algorithm to calculate the direct current control voltage at the current moment; and if the absolute value of the luminance difference at the current moment is less than or equal to the preset luminance difference threshold, using an incremental PID algorithm to calculate the direct current control voltage at the current moment.

With reference to the third possible implementation manner of the first aspect, in a fourth possible implementation manner of the first aspect, the using a positional PID algorithm to calculate the direct current control voltage at the current moment includes:

$$V_t = K_p \times E_t + K_i \times I_t + K_d \times D_t + V_{t-1}$$

where Vt is the direct current control voltage at the current moment; Et is the luminance difference at the current moment; It is an integral of an accumulated error of the difference at the current moment; and Dt is a second-order differential of the difference; and:

$$I_t = \sum_{k=0}^{t} E_k$$

$$D_t = E_t - E_{t-1}$$

where Kp is a positional proportion adjusting coefficient; Ki is a positional integral adjusting coefficient; Kd is a positional differential adjusting coefficient; Kp, Ki, and Kd are all constants; and t is the current moment.

With reference to the third possible implementation manner of the first aspect, in a fifth possible implementation manner of the first aspect, the using an incremental PID algorithm to calculate the direct current control voltage at the current moment includes:

$$V_t = K_p' \times (E_t - E_{t-1}) + K_i' \times E_t + K_d' \times (E_t - 2E_{t-1} + E_{t-2})$$

where Vt is the direct current control voltage at the current moment; Et is the luminance difference at the current moment; Kp' is an incremental proportion adjusting coefficient; Ki' is an incremental integral adjusting coefficient; Kd' is an incremental differential adjusting coefficient; Kp', Ki', and Kd' are all constants; and t is the current moment.

A second aspect provides an auto-iris control system, where the system includes a target luminance setting unit configured to set a target luminance value of an auto iris; a current luminance calculating unit configured to collect an image at a current moment, and calculate a luminance value of the image collected at the current moment; a difference calculating unit configured to compare the target luminance value with the luminance value of the image collected at the current moment, to obtain a difference between them and use it as a luminance difference at the current moment; a voltage calculating unit configured to compare an absolute value of the luminance difference at the current moment with a preset luminance difference threshold, determine a status of the auto iris at the current moment, and use a corresponding PID algorithm to calculate a direct current control voltage at the current moment; and an adjusting and controlling unit configured to adjust an action of the auto iris according to the calculated direct current control voltage.

In a first possible implementation manner of the second aspect, the current luminance calculating unit includes a sampling subunit configured to sample a luminance value of each pixel in the image collected at the current moment; and a first luminance calculating subunit configured to use the following formula to calculate an average value of luminance values of all pixels in the image, to obtain the luminance value of the image collected at the current moment:

$$Y_t = \frac{\sum_{i=1}^{n} \sum_{j=1}^{m} Y_{ij}}{n \times m}$$

where Yt is the luminance value of the image collected at the current moment; Yij is the luminance value of each pixel in the image collected at the current moment; m is the number of pixels horizontally included in the image; n is the number of pixels vertically included in the image; and n and m are both natural numbers.

In a second possible implementation manner of the second aspect, the current luminance calculating unit includes a sampling subunit configured to sample a luminance value of each pixel in the image collected at the current moment; a region selecting subunit configured to select a central region of the image; and a second luminance calculating subunit configured to use the following formula to calculate an average value of luminance values of pixels included in the central region of the image, to obtain the luminance value Yt of the image collected at the current moment:

$$Y_t = \frac{\sum_{i=a}^{b} \sum_{j=c}^{d} Y_{ij}}{(b-a+1)(d-c+1)}$$

where Yt is the luminance value of the image collected at the current moment; Yij is the luminance value of each pixel in the image collected at the current moment; a is a value of a start horizontal coordinate of the central region; b is a value of an end horizontal coordinate of the central region; c is a value of a start vertical coordinate of the central region; d is a value of an end vertical coordinate of the central region; and a, b, c, and d are all natural numbers.

With reference to the second aspect or either one of the possible implementation manners of the second aspect, in a third possible implementation manner of the second aspect, the voltage calculating unit includes a first voltage calculating subunit configured to, if the absolute value of the luminance difference at the current moment is greater than the preset luminance difference threshold, use a positional PID algorithm to calculate the direct current control voltage at the current moment; and a second voltage calculating subunit configured to, if the absolute value of the luminance difference at the current moment is less than or equal to the preset luminance difference threshold, use an incremental PID algorithm to calculate the direct current control voltage at the current moment.

With reference to the third possible implementation manner of the second aspect, in a fourth possible implementation manner of the second aspect, that the first voltage calculating subunit uses the positional PID algorithm to calculate the direct current control voltage at the current moment includes:

$$V_t = K_p \times E_t + K_i \times I_t + K_d \times D_t + V_{t-1}$$

where Vt is the direct current control voltage at the current moment; Et is the luminance difference at the current moment; It is an integral of an accumulated error of the difference at the current moment; and Dt is a second-order differential of the difference; and:

$$I_t = \sum_{k=0}^{t} E_k$$

$$D_t = E_t - E_{t-1}$$

where Kp is a positional proportion adjusting coefficient; Ki is a positional integral adjusting coefficient; Kd is a positional differential adjusting coefficient; Kp, Ki, and Kd are all constants; and t is the current moment.

With reference to the third possible implementation manner of the second aspect, in a fifth possible implementation manner of the second aspect, that the second voltage calculating subunit uses the incremental PID algorithm to calculate the direct current control voltage at the current moment includes:

$$V_t = K_p' \times (E_t - E_{t-1}) + K_i' \times E_t + K_d' \times (E_t - 2E_{t-1} + E_{t-2})$$

where Vt is the direct current control voltage at the current moment; Et is the luminance difference at the current moment; Kp' is an incremental proportion adjusting coefficient; Ki' is an incremental integral adjusting coefficient; Kd' is an incremental differential adjusting coefficient; Kp', Ki', and Kd' are all constants; and t is the current moment.

In the method according to embodiments of the present disclosure, a status of an auto iris at a current moment is determined according to a relationship between an absolute value of a luminance difference at the current moment and a preset luminance difference threshold; according to the status of the auto iris at the current moment, a corresponding PID algorithm is used to calculate a direct current control voltage required at the current moment, and an action of the auto iris is adjusted. In this way, full real-time dynamic feedback control for an auto iris is implemented, and a corresponding PID algorithm is used to perform adjustment and control according to a status of the auto iris, which can correct in real time a static shift and dynamic drift that are caused by factors such as an ambient temperature, a component characteristic difference, and an iris damping change, thereby improving control precision of the auto iris. In addition, in the method according to the embodiments of the present disclosure, the automatic adjustment performed using the PID algorithm according to the status of the auto iris can eliminate manual calibration work for a device in cases such as when a lens is replaced and a circuit component is changed, thereby reducing auto-iris adjustment time and human costs.

BRIEF DESCRIPTION OF DRAWINGS

To describe the technical solutions in the embodiments of the present disclosure or in the prior art more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The present disclosure provides an auto-iris control method and system, which can implement automatic calibration of an auto-iris lens, thereby reducing time and human costs and solve problems of a static shift and dynamic drift of a direct current control voltage of an iris, thereby improving control precision of the iris.

Figure 1:
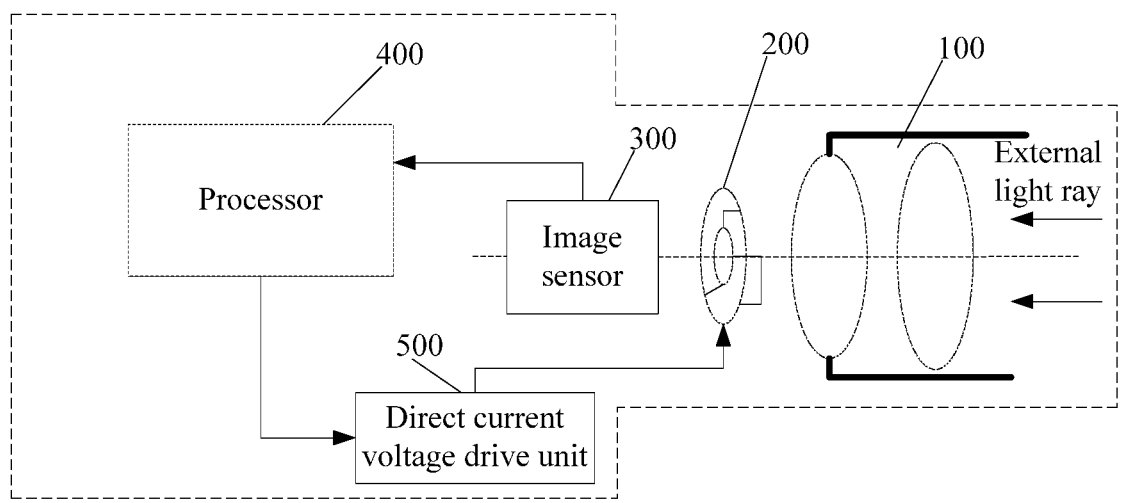
FIG. 1 is a diagram of a typical application scenario of an auto-iris control system according to an embodiment of the present disclosure.

Referring to FIG. 1, FIG. 1 is a diagram of a typical application scenario of an auto-iris control system according to an embodiment of the present disclosure. As shown in FIG. 1, an external light ray enters a device by passing through an optical structure, such as an eyeglass of a lens 100 of the device, and projects an image on an image sensor 300 through a hole between blades of an auto iris 200. By controlling a pore size of the hole between the blades of the auto iris 200, the amount of entered light of the external light ray can be controlled. A processor 400 of the device is responsible for collecting the image on the image sensor 300, calculating current average luminance of the image, comparing the calculated average luminance with target luminance, obtaining, by calculation, whether the iris needs to be opened or closed at present, providing a corresponding direct current voltage control value, and controlling the auto iris 200 to perform a corresponding action using a direct current voltage drive unit 500.

It should be noted that a device applicable to the auto-iris control system in this embodiment of the present disclosure may include a camera, a digital camera, a medical imaging instrument or other instruments and devices having an imaging function.

Figure 2:
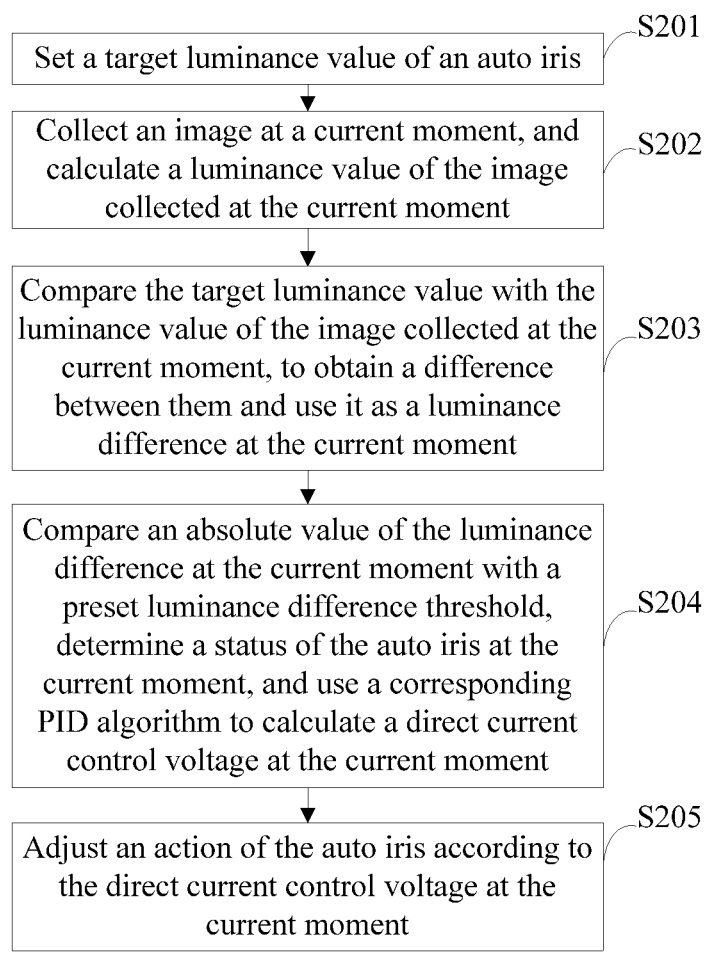
FIG. 2 is a flowchart of an auto-iris control method according to Embodiment 1 of the present disclosure.

Referring to FIG. 2, FIG. 2 is a flowchart of an auto-iris control method according to Embodiment 1 of the present disclosure. As shown in FIG. 2, the method includes the following steps.

Step S201: Set a target luminance value of an auto iris.

Step S202: Collect an image at a current moment, and calculate a luminance value of the image collected at the current moment.

Step S203: Compare the target luminance value with the luminance value of the image collected at the current moment, to obtain a difference between them and use the difference as a luminance difference at the current moment.

Step S204: Compare an absolute value of the luminance difference at the current moment with a preset luminance difference threshold, determine a status of the auto iris at the current moment, and use a corresponding PID algorithm to calculate a direct current control voltage at the current moment.

Step S205: Adjust an action of the auto iris according to the direct current control voltage at the current moment.

In the method according to Embodiment 1 of the present disclosure, a status of an auto iris at a current moment is determined according to a relationship between an absolute value of a luminance difference at the current moment and a preset luminance difference threshold; according to the status of the auto iris at the current moment, a corresponding PID algorithm is used to calculate a direct current control voltage required at the current moment, and an action of the auto iris is adjusted. In this way, full real-time dynamic feedback control for an auto iris is implemented, and a corresponding PID algorithm is used to perform adjustment and control according to a status of the auto iris, which can correct in real time a static shift and dynamic drift that are caused by factors such as an ambient temperature, a component characteristic difference, and an iris damping change, thereby improving control precision of the auto iris. In addition, in the method according to this embodiment of the present disclosure, the automatic adjustment performed using the PID algorithm according to the status of the auto iris can eliminate manual calibration work for a device in cases such as when a lens is replaced and a circuit component is changed, thereby reducing auto-iris adjustment time and human costs.

Figure 3:
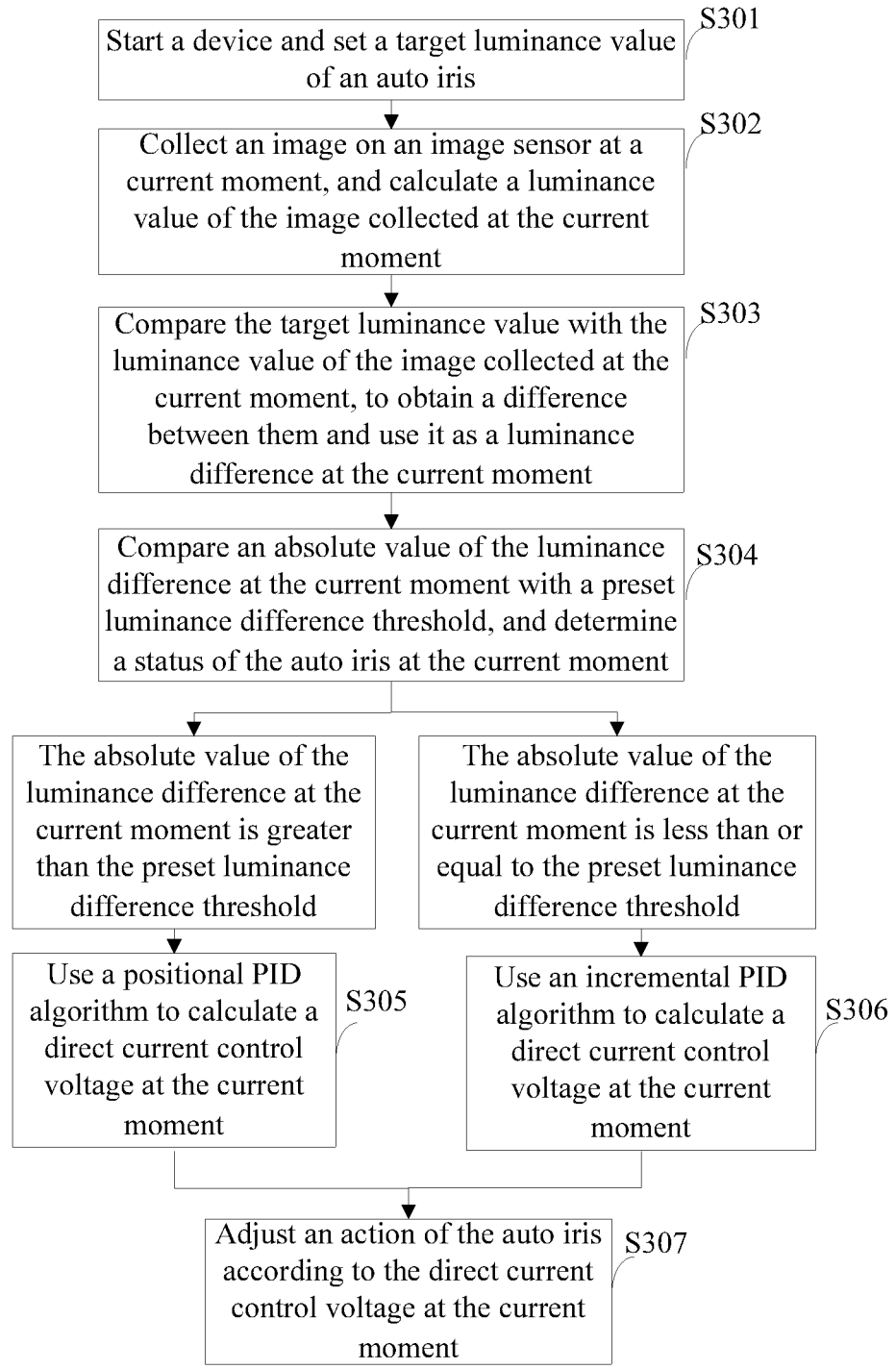
FIG. 3 is a flowchart of an auto-iris control method according to Embodiment 2 of the present disclosure.

Referring to FIG. 3, FIG. 3 is a flowchart of an auto-iris control method according to Embodiment 2 of the present disclosure. As shown in FIG. 3, the method includes the following steps.

Step S301: Start a device to perform an initialization process, and set various parameters for starting an auto iris, including setting a target luminance value Ytag of the auto iris.

It should be noted that start parameters of the auto iris may include a range of a direct current voltage drive value that matches all lenses of the auto iris, an initial value of a direct current drive voltage, and the like. A setting principle of the target luminance value Ytag may be complying with a human subjective comfort level. Setting various parameters for starting an auto iris belongs to technologies known in the art, which is not described in detail herein.

Step S302: Collect an image on an image sensor of the device at a current moment, and calculate a luminance value Yt of the image collected at the current moment.

More specifically, an external light ray enters a camera by passing through an optical structure, such as an eyeglass of a lens of the device, and projects an image on the image sensor through a hole between blades of the auto iris. By collecting the image on the image sensor and calculating luminance of the collected image, the luminance value Yt of the image collected at the current moment can be obtained.

In an actual application, there are many methods for calculating the luminance value Yt of the image collected at the current moment. In this embodiment of the present disclosure, an average luminance method and a central luminance method are used as examples for description.

When the average luminance method is used, calculating the luminance value Yt of the image collected at the current moment includes sampling a luminance value Yij of each pixel in the image collected at the current moment, and calculating an average value of luminance values of all pixels in the image according to formula (1) to obtain the luminance value Yt of the image collected at the current moment.

$$Y_t = \frac{\sum_{i=1}^{n}\sum_{j=1}^{m} Y_{ij}}{n \times m} \quad (1)$$

where Yij is the luminance value of each pixel in the image collected at the current moment; m is the number of pixels horizontally included in the image; n is the number of pixels vertically included in the image; and n and m are both natural numbers.

Figures 4, 5, 6:
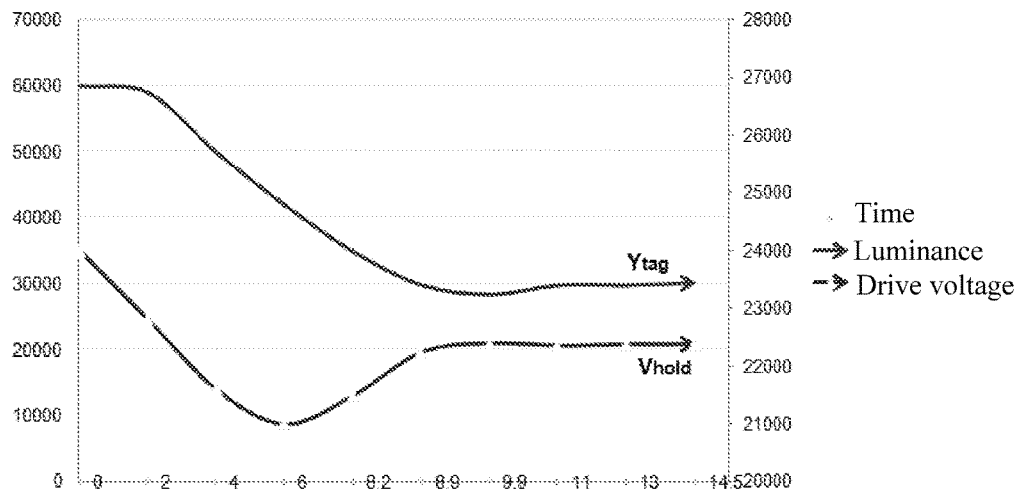
FIG. 4 is a schematic diagram of image pixels in an average luminance method.
FIG. 5 is a schematic diagram of image pixels in a central luminance method.
FIG. 6 is a control line graph of a positional PID algorithm.

Referring to FIG. 4, FIG. 4 is a schematic diagram of image pixels in the average luminance method. By sampling the image collected and obtained from the image sensor, the luminance value Yij (i=1, 2, . . . , n; j=1, 2, . . . , m) of each pixel in the image is obtained. As shown in FIG. 4, the image includes n rows horizontally, and each row includes m pixels; the image includes m columns vertically, and each column includes n pixels; the entire image includes n×m pixels. The luminance value of each pixel is Yij; an average value is calculated for the luminance values of all the pixels in the image according to formula (1), and is used as the luminance value Yt of the image collected at the current moment.

When the central luminance method is used, calculating the luminance value Yt of the image collected at the current moment includes sampling a luminance value Yij of each pixel in the image collected at the current moment, selecting a central region of the image, and calculating an average value of luminance values of pixels included in the central region of the image according to formula (2) to obtain the luminance value Yt of the image collected at the current moment.

$$Y_t = \frac{\sum_{i=a}^{b}\sum_{j=c}^{d} Y_{ij}}{(b-a+1)(d-c+1)} \quad (2)$$

where Yij is the luminance value of each pixel in the image collected at the current moment; a is a value of a start horizontal coordinate of the central region; b is a value of an end horizontal coordinate of the central region; c is a value of a start vertical coordinate of the central region; d is a value of an end vertical coordinate of the central region; and a, b, c, and d are all natural numbers.

Referring to FIG. 5, FIG. 5 is a schematic diagram of image pixels in the central luminance method. By sampling the image collected and obtained from the image sensor, the luminance value Yij (i=1, 2, . . . , n; j=1, 2, . . . , m) of each pixel in the image is obtained. The central region of the image is selected. The start horizontal coordinate of pixels in the central region is a, the end horizontal coordinate is b, the start vertical coordinate is c, and the end vertical coordinate is d, which are shown in FIG. 5. An average value is calculated for the luminance values of the pixels included in the central region of the image according to formula (2), and is used as the luminance value Yt of the image collected at the current moment.

The foregoing uses only the average luminance method and the central luminance method as examples for description. In an actual application, any calculation method that has a same function as the foregoing method for calculating the luminance value Yt of the image collected at the current moment can be used in this embodiment of the present disclosure to implement a same objective.

Step S303: Compare the target luminance value Ytag with the luminance value Yt of the image collected at the current moment, to obtain a difference between them and use the difference as a luminance difference Et at the current moment.

The luminance difference Et at the current moment is:

$$E_t = Y_{tag} - Y_t \quad (3)$$

Step S304: Compare an absolute value |Et| of the luminance difference at the current moment with a preset luminance difference threshold Ethr, and determine a status of the auto iris at the current moment; when the absolute value |Et| of the luminance difference at the current moment is greater than the preset luminance difference threshold Ethr, proceed to step S305; when the absolute value |Et| of the luminance difference at the current moment is less than or equal to the preset luminance difference threshold Ethr, proceed to step S306.

In this embodiment of the present disclosure, by comparing the absolute value |Et| of the luminance difference at the current moment with the preset luminance difference threshold Ethr, the status of the auto iris at the current moment can be determined. For example, when the absolute value |Et| of the luminance difference at the current moment is greater than the preset luminance difference threshold Ethr, it indicates that a luminance change at the current moment is relatively big, the auto iris is in a large-deviation stage, and fast and substantial adjustment is needed; when the absolute value |Et| of the luminance difference at the current moment is less than or equal to the preset luminance difference threshold Ethr, it indicates that a luminance change at the current moment is relatively small, the auto iris is in a small-deviation stage, and tiny and meticulous adjustment is needed. Therefore, in the method according to this embodiment of the present disclosure, a corresponding PID algorithm is used to calculate a direct current control voltage Vt at the current moment according to the status of the auto iris at the current moment, and corresponding adjustment and control are performed on the auto iris, so as to implement full real-time dynamic feedback control for the auto iris.

Step S305: Use a positional PID algorithm to calculate a direct current control voltage Vt at the current moment, and proceed to step S307.

More specifically, when the absolute value |Et| of the luminance difference at the current moment is greater than the preset luminance difference threshold Ethr, it indicates that a luminance change of the image at the current moment is relatively big (for example, the camera is in a moment when the camera is being started or in a moment when luminance of an external environment dramatically changes); at this moment, the positional PID algorithm is used to calculate the direct current control voltage Vt at the current moment.

More specifically, the positional PID algorithm shown by formula (4) is used to calculate the direct current control voltage Vt at the current moment, and a control curve of the algorithm may be the curve shown in FIG. 6. The horizontal coordinate is time t, the left vertical coordinate is a mathematically quantized value of the luminance value Yt of the image, and the right vertical coordinate is a mathematically quantized value of the direct current control voltage Vt.

$$V_t = K_p \times E_t + K_i \times I_t + K_d \times D_t + V_{t-1} \quad (4)$$

where Kp is a positional proportion adjusting coefficient; Ki is a positional integral adjusting coefficient; Kd is a positional differential adjusting coefficient; Kp, Ki, and Kd are all constants; and t is the current moment.

In formula (4), It is an integral of an accumulated error of the difference at the current moment; Dt is a second-order differential of the difference; and:

$$I_t = \sum_{k=0}^{t} E_k \quad (5)$$

$$D_t = E_t - E_{t-1} \quad (6)$$

It should be noted that calculating the luminance difference Et at the current moment is used to control the auto iris to be adjusted towards a direction in which the difference is reduced; calculating the integral It of the accumulated error of the difference at the current moment is used to control the iris to be stabilized towards a direction in which the accumulated error is zero; calculating the second-order differential of the difference is used to predict an adjustment and change trend of the auto iris and to restrain a system overshoot.

When the absolute value |Et| of the luminance difference at the current moment is greater than the preset luminance difference threshold Ethr, an objective of using the positional PID algorithm is that the direct current control voltage Vt of the auto iris that is calculated can approach a target voltage Vhold (where the target voltage Vhold is a voltage value corresponding to the target luminance value Ytag), such that luminance of the image rapidly approaches the target luminance value Ytag by means of adjustment to the auto iris, thereby improving a speed of adjusting the auto iris. It can be seen from FIG. 5 that, when the positional PID algorithm is used, the luminance value Yt of the image rapidly approaches the target luminance value Ytag, and the direct current control voltage Vt also rapidly approaches the target voltage Vhold. When the absolute value |Et| of the luminance difference is less than or equal to the preset luminance difference threshold Ethr, a stage of adjustment by an incremental PID algorithm is entered.

Step S306: Use an incremental PID algorithm to calculate a direct current control voltage Vt at the current moment, and proceed to step S307.

More specifically, when the absolute value |Et| of the luminance difference at the current moment is less than or equal to the preset luminance difference threshold Ethr, it indicates that a luminance change of the image at the current moment is relatively small (for example, the auto iris of the camera is preliminarily adjusted stably, or a luminance change of an external environment is relatively small); at this moment, the incremental PID algorithm is used to calculate the direct current control voltage Vt at the current moment.

Figure 7:
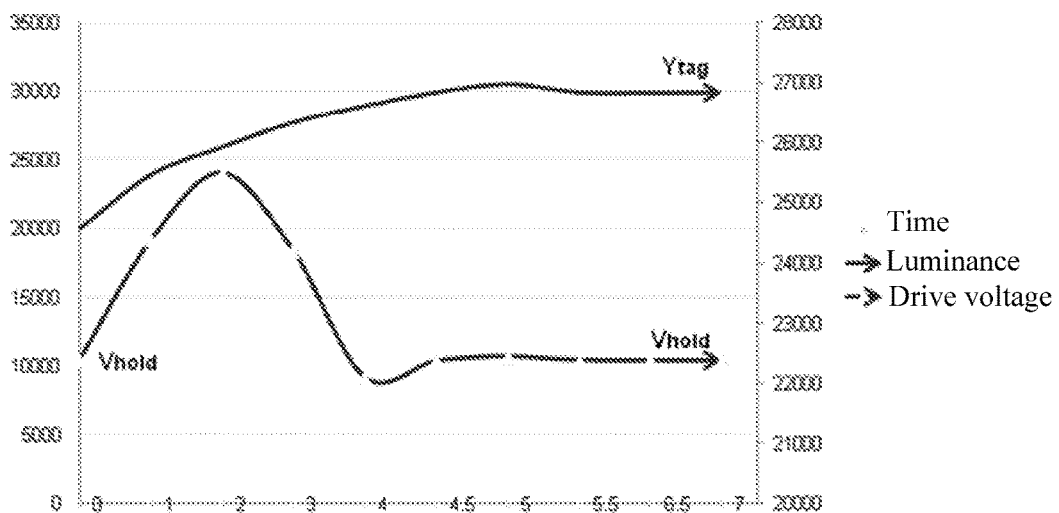
FIG. 7 is a control line graph of an incremental PID algorithm.

More specifically, the incremental PID algorithm shown by formula (7) is used to calculate the direct current control voltage Vt at the current moment, and a control curve of the algorithm may be the curve shown in FIG. 7. The horizontal coordinate is time t, the left vertical coordinate is a mathematically quantized value of the luminance value Yt of the image, and the right vertical coordinate is a mathematically quantized value of the direct current control voltage Vt.

$$V_t = K_p' \times (E_t - E_{t-1}) + K_i' \times E_t + K_d' \times (E_t - 2E_{t-1} + E_{t-2}) \qquad (7)$$

where Kp' is an incremental proportion adjusting coefficient; Ki' is an incremental integral adjusting coefficient; Kd' is an incremental differential adjusting coefficient; Kp', Ki', and Kd' are all constants; and t is the current moment.

It should be noted that, when the incremental PID algorithm is used for adjustment, if the luminance value Yt of the image at the current moment is retained at the target luminance value Ytag, the auto iris is retained at a current position and is not adjusted; if the luminance value Yt of the image at the current moment is less than the target luminance value Ytag, the auto iris is adjusted towards an opening direction, and a greater absolute value |Et| of the luminance difference indicates that an opening speed of the auto iris is faster; if the luminance value Yt of the image at the current moment is greater than the target luminance value Ytag, the auto iris is adjusted towards a closing direction, and a greater absolute value |Et| of the luminance difference indicates that a closing speed of the auto iris is faster.

In the method according to this embodiment of the present disclosure, the status of the auto iris at the current moment is determined according to the absolute value |Et| of the luminance difference at the current moment, and a corresponding PID algorithm is used to calculate the direct current control voltage Vt at the current moment according to the status of the auto iris. When the absolute value |Et| of the luminance difference of the image is relatively big, the positional PID algorithm is used, such that the luminance Yt of the image rapidly approaches the target luminance value Ytag, and the auto iris achieves stability preliminarily; when the auto iris achieves the preliminary stability after being adjusted by the positional PID algorithm, the absolute value |Et| of the luminance difference of the image is relatively small, and at this moment, it is appropriate that the incremental PID algorithm is used to perform meticulous adjustment, which facilitates improving control precision of the auto iris, restraining an overshoot occurred in an adjustment process, and overcoming adjustment flapping.

Step S307: Adjust an action of the auto iris according to the direct current control voltage Vt at the current moment that is calculated, return to step S302 after a period of time (for example, using time T as a period), and perform repeated and iterative adjustment until the device quits an adjustment operation of the auto iris.

Because luminance of an external environment changes constantly, luminance of an image obtained by the device also changes constantly; therefore, adjustment of the auto iris is a periodic process.

Using time T as a period, the operations in steps S302 to S307 are repeatedly executed, such that in each period, the auto iris can achieve stability, and the luminance Yt of the image is stabilized at the target luminance value Ytag, thereby achieving an objective of automatic adjustment of the auto iris until the device quits an adjustment operation of the auto iris. The direct current control voltage calculated in the foregoing steps is a direct current control voltage output at the current moment (that is, a current period), is used to adjust an action of the auto iris at the current moment and affects a status and image luminance of the auto iris in a next period.

In the method according to Embodiment 2 of the present disclosure, a status of an auto iris at a current moment is determined according to a relationship between an absolute value of a luminance difference at the current moment and a preset luminance difference threshold. If the absolute value of the luminance difference at the current moment is greater, a positional PID algorithm is used to calculate a direct current control voltage required at the current moment, and if the absolute value of the luminance difference at the current moment is smaller, an incremental PID algorithm is used to calculate the direct current control voltage required at the current moment. The auto iris at the current moment is adjusted according to the direct current control voltage required at the current moment that is obtained according to different PID algorithms. In this way, full real-time dynamic feedback control for an auto iris is implemented, and a corresponding PID algorithm is used to perform adjustment and control according to a status of the auto iris, which can correct in real time a static shift and dynamic drift that are caused by factors such as an ambient temperature, a component characteristic difference, and an iris damping change, thereby improving control precision of the auto iris. In addition, in the method according to this embodiment of the present disclosure, the automatic adjustment performed using the PID algorithm according to the status of the auto iris can eliminate manual calibration work for a device in cases such as when a lens is replaced and a circuit component is changed, thereby reducing auto-iris adjustment time and human costs.

Further, the PID algorithm used in the method according to Embodiment 2 of the present disclosure is a second-order control algorithm, which improves control precision of an auto iris, and can effectively restrain an excess of control on the auto iris, overcome flapping, and promote adaptation of the auto-iris control method.

Figure 8:
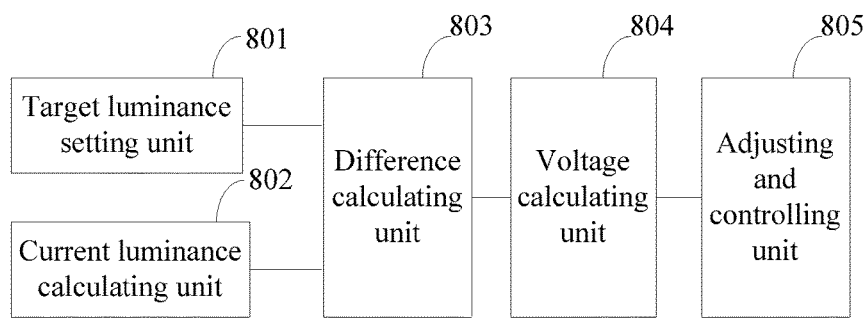
FIG. 8 is a structural diagram of an auto-iris control system according to an embodiment of the present disclosure.

Corresponding to the auto-iris control methods according to the embodiments of the present disclosure, an embodiment of the present disclosure further provides an auto-iris control system. Referring to FIG. 8, FIG. 8 is a structural diagram of the auto-iris control system according to this embodiment of the present disclosure. As shown in FIG. 8, the system may include a target luminance setting unit 801, a current luminance calculating unit 802, a difference calculating unit 803, a voltage calculating unit 804, and an adjusting and controlling unit 805.

The target luminance setting unit 801 is configured to set a target luminance value of an auto iris.

The current luminance calculating unit 802 is configured to collect an image at a current moment, and calculate a luminance value of the image collected at the current moment.

The difference calculating unit 803 is configured to compare the target luminance value with the luminance value of the image collected at the current moment, to obtain a difference between them and use the difference as a luminance difference at the current moment.

The voltage calculating unit 804 is configured to compare an absolute value of the luminance difference at the current moment with a preset luminance difference threshold, determine a status of the auto iris at the current moment, and use a corresponding PID algorithm to calculate a direct current control voltage at the current moment.

The adjusting and controlling unit 805 is configured to adjust an action of the auto iris according to the calculated direct current control voltage.

In the system according to the embodiment of the present disclosure, a status of an auto iris at a current moment is determined according to a relationship between an absolute value of a luminance difference at the current moment and a preset luminance difference threshold; according to the status of the auto iris at the current moment, a corresponding PID algorithm is used to calculate a direct current control voltage required at the current moment, and an action of the auto iris is adjusted. In this way, full real-time dynamic feedback control for an auto iris is implemented, and a corresponding PID algorithm is used to perform adjustment and control according to a status of the auto iris, which can correct in real time a static shift and dynamic drift that are caused by factors such as an ambient temperature, a component characteristic difference, and an iris damping change, thereby improving control precision of the auto iris. In addition, in the system according to this embodiment of the present disclosure, the automatic adjustment performed using the PID algorithm according to the status of the auto iris can eliminate manual calibration work for a device in cases such as when a lens is replaced and a circuit component is changed, thereby reducing auto-iris adjustment time and human costs.

In an actual application, there are many methods for the current luminance calculating unit 802 to calculate the luminance value Yt of the image collected at the current moment. In this embodiment of the present disclosure, an average luminance method and a central luminance method are used as examples for description.

For the average luminance method, the current luminance calculating unit 802 may include a sampling subunit and a first luminance calculating subunit.

The sampling subunit is configured to sample a luminance value of each pixel in the image collected at the current moment.

The first luminance calculating subunit is configured to use the following formula to calculate an average value of luminance values of all pixels in the image, to obtain the luminance value of the image collected at the current moment:

$$Y_t = \frac{\sum_{i=1}^{n}\sum_{j=1}^{m} Y_{ij}}{n \times m} \quad (1)$$

where Yt is the luminance value of the image collected at the current moment; Yij is the luminance value of each pixel in the image collected at the current moment; m is the number of pixels horizontally included in the image; n is the number of pixels vertically included in the image; and n and m are both natural numbers.

For the central luminance method, the current luminance calculating unit 802 may include a sampling subunit, a region selecting subunit, and a second luminance calculating subunit.

The sampling subunit is configured to sample a luminance value of each pixel in the image collected at the current moment.

The region selecting subunit is configured to select a central region of the image.

The second luminance calculating subunit is configured to use the following formula to calculate an average value of luminance values of pixels included in the central region of the image, to obtain the luminance value Yt of the image collected at the current moment:

$$Y_t = \frac{\sum_{i=a}^{b}\sum_{j=c}^{d} Y_{ij}}{(b-a+1)(d-c+1)} \quad (2)$$

where Yt is the luminance value of the image collected at the current moment; Yij is the luminance value of each pixel in the image collected at the current moment; a is a value of a start horizontal coordinate of the central region; b is a value of an end horizontal coordinate of the central region; c is a value of a start vertical coordinate of the central region; d is a value of an end vertical coordinate of the central region; and a, b, c, and d are all natural numbers.

Further, in this embodiment of the present disclosure, the voltage calculating unit 804 can determine the status of the auto iris at the current moment by comparing the absolute value |Et| of the luminance difference at the current moment with the preset luminance difference threshold Ethr. For example, when the absolute value |Et| of the luminance difference at the current moment is greater than the preset luminance difference threshold Ethr, it indicates that a luminance change at the current moment is relatively big, the auto iris is in an unstable stage, and substantial and fast adjustment is needed; when the absolute value |Et| of the luminance difference at the current moment is less than or equal to the preset luminance difference threshold Ethr, it indicates that a luminance change at the current moment is relatively small, the auto iris is in a preliminarily stable stage, and tiny and meticulous adjustment is needed. Therefore, in the system according to this embodiment of the present disclosure, the corresponding PID algorithm is used to calculate the direct current control voltage Vt at the current moment according to the status of the auto iris at the current moment, and corresponding adjustment and control are performed on the auto iris, so as to implement full real-time dynamic feedback control for the auto iris.

The voltage calculating unit 804 includes a first voltage calculating subunit and a second voltage calculating subunit.

The first voltage calculating subunit is configured to, if the absolute value of the luminance difference at the current moment is greater than the preset luminance difference threshold, use a positional PID algorithm to calculate the direct current control voltage at the current moment.

The second voltage calculating subunit is configured to, if the absolute value of the luminance difference at the current moment is less than or equal to the preset luminance difference threshold, use an incremental PID algorithm to calculate the direct current control voltage at the current moment.

Preferably, that the first voltage calculating subunit uses the positional PID algorithm to calculate the direct current control voltage at the current moment may include:

$$V_t = K_p \times E_t + K_i \times I_t + K_d \times D_t + V_{t-1} \quad (4)$$

where Vt is the direct current control voltage at the current moment; Et is the luminance difference at the current moment; It is an integral of an accumulated error of the difference at the current moment; and Dt is a second-order differential of the difference; and:

$$I_t = \sum_{k=0}^{t} E_k \quad (5)$$

$$D_t = E_t - E_{t-1} \quad (6)$$

where Kp is a positional proportion adjusting coefficient; Ki is a positional integral adjusting coefficient; Kd is a positional differential adjusting coefficient; Kp, Ki, and Kd are all constants; and t is the current moment.

Preferably, that the second voltage calculating subunit uses the incremental PID algorithm to calculate the direct current control voltage at the current moment may include:

$$V_t = K_p' \times (E_t - E_{t-1}) + K_i' \times E_t + K_d' \times (E_t - 2E_{t-1} + E_{t-2}) \quad (7)$$

where Vt is the direct current control voltage at the current moment; Et is the luminance difference at the current moment; Kp' is an incremental proportion adjusting coefficient; Ki' is an incremental integral adjusting coefficient; Kd' is an incremental differential adjusting coefficient; Kp', Ki', and Kd' are all constants; and t is the current moment.

In the system according to the embodiment of the present disclosure, a status of an auto iris at a current moment is determined according to a relationship between an absolute value of a luminance difference at the current moment and a preset luminance difference threshold. If the absolute value of the luminance difference at the current moment is greater, a positional PID algorithm is used to calculate a direct current control voltage required at the current moment, and if the absolute value of the luminance difference at the current moment is smaller, an incremental PID algorithm is used to calculate the direct current control voltage required at the current moment. The auto iris at the current moment is adjusted according to the direct current control voltage required at the current moment that is obtained according to different PID algorithms. In this way, full real-time dynamic feedback control for an auto iris is implemented, and a corresponding PID algorithm is used to perform adjustment and control according to a status of the auto iris, which can correct in real time a static shift and dynamic drift that are caused by factors such as an ambient temperature, a component characteristic difference, and an iris damping change, thereby improving control precision of the auto iris. In addition, in the system according to this embodiment of the present disclosure, the automatic adjustment performed using the PID algorithm according to the status of the auto iris can eliminate manual calibration work for a device in cases such as when a lens is replaced and a circuit component is changed, thereby reducing auto-iris adjustment time and human costs.

Further, the PID algorithm used in the system according to the embodiment of the present disclosure is a second-order control algorithm, which improves control precision of an auto iris, and can effectively restrain an excess of control on the auto iris, overcome flapping, and promote adaptation of an auto-iris control method.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present disclosure essentially, or the part contributing to the prior art, or a part of the technical solutions may be implemented in a form of a software product. The software product is stored in a storage medium and includes several instructions for instructing a computer device (which may be a personal computer, a server, or a network device) or a processor to perform all or a part of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An auto-iris control method, comprising:
   setting a target luminance value of an auto iris;
   collecting an image at a current moment;
   calculating a luminance value of the image collected at the current moment, wherein calculating the luminance value of the image collected at the current moment comprises:
   sampling a luminance value of each pixel in the image collected at the current moment; and
   using the following formula to calculate an average value of luminance values of all pixels in the image to obtain the luminance value of the image collected at the current moment:

$$Y_t = \frac{\sum_{i=1}^{n}\sum_{j=1}^{m} Y_{ij}}{n \times m},$$

wherein Yt is the luminance value of the image collected at the current moment, Yij is the luminance value of each pixel in the image collected at the current moment, m is a number of pixels horizontally comprised in the image, n is a number of pixels vertically comprised in the image, and n and m are both natural numbers;

comparing the target luminance value with the luminance value of the image collected at the current moment to obtain a difference between the target luminance value and the luminance value of the image collected at the current moment and use the difference as a luminance difference at the current moment;

comparing an absolute value of the luminance difference at the current moment with a preset luminance difference threshold;

determining a status of the auto iris at the current moment;

using a corresponding proportional-integral-derivative (PID) algorithm to calculate a direct current control voltage at the current moment; and adjusting an action of the auto iris according to the calculated direct current control voltage.

2. An auto-iris control method, comprising:

setting a target luminance value of an auto iris;

collecting an image at a current moment;

calculating a luminance value of the image collected at the current moment, wherein calculating the luminance value of the image collected at the current moment comprises:

sampling a luminance value of each pixel in the image collected at the current moment;

selecting a central region of the image; and using the following formula to calculate an average value of luminance values of pixels comprised in the central region of the image to obtain the luminance value of the image collected at the current moment:

$$Y_t = \frac{\sum_{i=a}^{b}\sum_{j=c}^{d} Y_{ij}}{(b-a+1)(d-c+1)},$$

wherein Yt is the luminance value of the image collected at the current moment, Yij is the luminance value of each pixel in the image collected at the current moment, a is a value of a start horizontal coordinate of the central region, b is a value of an end horizontal coordinate of the central region, c is a value of a start vertical coordinate of the central region, d is a value of an end vertical coordinate of the central region, and a, b, c, and d are all natural numbers;

comparing the target luminance value with the luminance value of the image collected at the current moment to obtain a difference between the target luminance value and the luminance value of the image collected at the current moment and use the difference as a luminance difference at the current moment;

comparing an absolute value of the luminance difference at the current moment with a preset luminance difference threshold;

determining a status of the auto iris at the current moment;

using a corresponding proportional-integral-derivative (PID) algorithm to calculate a direct current control voltage at the current moment; and adjusting an action of the auto iris according to the calculated direct current control voltage.

3. An auto-iris control method, comprising:

setting a target luminance value of an auto iris;

collecting an image at a current moment;

calculating a luminance value of the image collected at the current moment;

comparing the target luminance value with the luminance value of the image collected at the current moment to obtain a difference between the target luminance value and the luminance value of the image collected at the current moment and use the difference as a luminance difference at the current moment;

comparing an absolute value of the luminance difference at the current moment with a preset luminance difference threshold;

determining a status of the auto iris at the current moment;

using a corresponding proportional-integral-derivative (PID) algorithm to calculate a direct current control voltage at the current moment, wherein comparing the absolute value of the luminance difference at the current moment with the preset luminance difference threshold, determining the status of the auto iris at the current moment, and using the corresponding PID algorithm to calculate the direct current control voltage at the current moment comprises:

using a positional PID algorithm to calculate the direct current control voltage at the current moment when the absolute value of the luminance difference at the current moment is greater than the preset luminance difference threshold; and using an incremental PID algorithm to calculate the direct current control voltage at the current moment when the absolute value of the luminance difference at the current moment is less than or equal to the preset luminance difference threshold; and adjusting an action of the auto iris according to the calculated direct current control voltage.

4. The method according to claim 3, wherein using the positional PID algorithm to calculate the direct current control voltage at the current moment comprises: $V_t = K_p \times E_t + K_i \times I_t + K_d \times D_t + V_{t-1}$, wherein Vt is the direct current control voltage at the current moment, Et is the luminance difference at the current moment, It is an integral of an accumulated error of the difference at the current moment, and Dt is a second-order differential of the difference, wherein $$I_t = \sum_{k=0}^{t} E_k$$

and $D_t = E_t - E_{t-1}$, and wherein Kp is a positional proportion adjusting coefficient, Ki is a positional integral adjusting coefficient, Kd is a positional differential adjusting coefficient, Kp, Ki, and Kd are all constants, and t is the current moment.

5. The method according to claim 3, wherein using the incremental PID algorithm to calculate the direct current control voltage at the current moment comprises: $V_t = K_p' \times (E_t - E_{t-1}) + K_i' \times E_t + K_d' \times (E_t - 2E_{t-1} + E_{t-2})$, and wherein Vt is the direct current control voltage at the current moment, Kp' is an incremental proportion adjusting coefficient, Ki' is an incremental integral adjusting coefficient, Kd' is an incremental differential adjusting coefficient, Kp', Ki', and Kd' are all constants, and t is the current moment.

6. An auto-iris control system, comprising:
an auto iris;
a processor coupled to the auto iris and configured to set a target luminance value of an auto iris; and
an image sensor coupled to the processor and configured to collect an image at a current moment,
wherein the processor is further configured to:
    calculate a luminance value of the image collected at the current moment by:
        sampling a luminance value of each pixel in the image collected at the current moment; and
        using the following formula to calculate an average value of luminance values of all pixels in the image to obtain the luminance value of the image collected at the current moment:

$$Y_t = \frac{\sum_{i=1}^{n}\sum_{j=1}^{m} Y_{ij}}{n \times m},$$

and wherein Yt is the luminance value of the image collected at the current moment, Yij is the luminance value of each pixel in the image collected at the current moment, m is a number of pixels horizontally comprised in the image, n is a number of pixels vertically comprised in the image, and n and m are both natural numbers;
    compare the target luminance value with the luminance value of the image collected at the current moment to obtain a difference between the target luminance value and the luminance value of the image collected at the current moment and use the difference as a luminance difference at the current moment;
    compare an absolute value of the luminance difference at the current moment with a preset luminance difference threshold;
    determine a status of the auto iris at the current moment;
    use a corresponding proportional-integral-derivative (PID) algorithm to calculate a direct current control voltage at the current moment; and
    adjust an action of the auto iris according to the calculated direct current control voltage.

7. An auto-iris control system, comprising:
an auto iris;
a processor coupled to the auto iris and configured to set a target luminance value of an auto iris; and
an image sensor coupled to the processor and configured to collect an image at a current moment,
wherein the processor is further configured to:
    calculate a luminance value of the image collected at the current moment by:
        sampling a luminance value of each pixel in the image collected at the current moment;
        selecting a central region of the image; and
        using the following formula to calculate an average value of luminance values of pixels comprised in the central region of the image to obtain the luminance value of the image collected at the current moment:

$$Y_t = \frac{\sum_{i=a}^{b}\sum_{j=c}^{d} Y_{ij}}{(b-a+1)(d-c+1)},$$

and wherein Yt is the luminance value of the image collected at the current moment, Yij is the luminance value of each pixel in the image collected at the current moment, a is a value of a start horizontal coordinate of the central region, b is a value of an end horizontal coordinate of the central region, c is a value of a start vertical coordinate of the central region, d is a value of an end vertical coordinate of the central region, and a, b, c, and d are all natural numbers;
    compare the target luminance value with the luminance value of the image collected at the current moment to obtain a difference between the target luminance value and the luminance value of the image collected at the current moment and use the difference as a luminance difference at the current moment;
    compare an absolute value of the luminance difference at the current moment with a preset luminance difference threshold;
    determine a status of the auto iris at the current moment;
    use a corresponding proportional-integral-derivative (PID) algorithm to calculate a direct current control voltage at the current moment; and
    adjust an action of the auto iris according to the calculated direct current control voltage.

8. An auto-iris control system, comprising:
an auto iris;
a processor coupled to the auto iris and configured to set a target luminance value of an auto iris; and
an image sensor coupled to the processor and configured to collect an image at a current moment,
wherein the processor is further configured to:
    calculate a luminance value of the image collected at the current moment;
    compare the target luminance value with the luminance value of the image collected at the current moment to obtain a difference between the target luminance value and the luminance value of the image collected at the current moment and use the difference as a luminance difference at the current moment;
    compare an absolute value of the luminance difference at the current moment with a preset luminance difference threshold;
    determine a status of the auto iris at the current moment;
    use a positional proportional-integral-derivative (PID) algorithm to calculate the direct current control voltage at the current moment when the absolute value of the luminance difference at the current moment is greater than the preset luminance difference threshold;
    use an incremental PID algorithm to calculate the direct current control voltage at the current moment when the absolute value of the luminance difference at the current moment is less than or equal to the preset luminance difference threshold;
    use a corresponding PID algorithm to calculate a direct current control voltage at the current moment; and adjust an action of the auto iris according to the calculated direct current control voltage.

9. The system according to claim 8, wherein using the positional PID algorithm to calculate the direct current control voltage at the current moment comprises: $V_t = K_p \times E_t + K_i \times I_t + K_d \times D_t + V_{t-1}$, wherein Vt is the direct current control voltage at the current moment, Et is the luminance difference at the current moment, It is an integral of an accumulated error of the difference at the current moment, and Dt is a second-order differential of the difference, wherein $$I_t = \sum_{k=0}^{t} E_k,$$

$D_t = E_t - E_{t-1}$, and wherein Kp is a positional proportion adjusting coefficient, Ki is a positional integral adjusting coefficient, Kd is a positional differential adjusting coefficient, Kp, Ki, and Kd are all constants, and t is the current moment.

10. The system according to claim 8, wherein using the incremental PID algorithm to calculate the direct current control voltage at the current moment comprises: $V_t = K_p' \times (E_t - E_{t-1}) + K_i' \times E_t + K_d' \times (E_t - 2E_{t-1} + E_{t-2})$, and wherein Vt is the direct current control voltage at the current moment, Et is the luminance difference at the current moment, Kp' is an incremental proportion adjusting coefficient, Ki' is an incremental integral adjusting coefficient, Kd' is an incremental differential adjusting coefficient, Kp', Ki', and Kd' are all constants, and t is the current moment.

\* \* \* \* \*